United States Patent [19]

Grotkasten

[11] Patent Number: 4,681,521

[45] Date of Patent: Jul. 21, 1987

[54] FEEDING AND POSITIONING APPARATUS FOR A HEATING PRESS

[75] Inventor: Klaus Grotkasten, Hamburg, Fed. Rep. of Germany

[73] Assignee: Fried. Krupp G.m.b.H., Essen, Fed. Rep. of Germany

[21] Appl. No.: 801,083

[22] Filed: Nov. 22, 1985

[30] Foreign Application Priority Data

Dec. 1, 1984 [DE] Fed. Rep. of Germany ....... 3443947

[51] Int. Cl.[4] .............................................. B29C 35/02
[52] U.S. Cl. ........................................ 425/36; 294/88; 294/119.3; 425/38; 425/43
[58] Field of Search ........................ 425/35, 36, 38, 40, 425/42, 43, 400, 407; 264/315, 326, DIG. 74; 294/88, 119.3

[56] References Cited

U.S. PATENT DOCUMENTS

| | | | |
|---|---|---|---|
| 3,620,561 | 11/1971 | Grotkasten et al. | 294/88 X |
| 3,790,656 | 2/1974 | Getz | 425/38 X |
| 3,809,423 | 5/1974 | Gazuit | 425/38 X |
| 3,845,979 | 11/1974 | Schatz et al. | 425/38 X |
| 4,045,150 | 8/1977 | Gazuit | 425/38 X |
| 4,279,438 | 7/1981 | Singh | 294/88 |
| 4,403,801 | 9/1983 | Huff et al. | 294/119.3 |
| 4,410,210 | 10/1983 | De Sivry et al. | 294/119.3 |
| 4,449,903 | 5/1984 | Hasegawa et al. | 425/38 |
| 4,472,125 | 9/1984 | Kubo et al. | 425/38 |
| 4,474,399 | 10/1984 | Lauber | 425/38 X |
| 4,597,728 | 7/1986 | Mc Glashen | 425/43 X |
| 4,618,303 | 10/1986 | Irie | 425/38 X |

FOREIGN PATENT DOCUMENTS 50-38151 12/1975 Japan .................... 425/38

Primary Examiner—Richard L. Chiesa
Attorney, Agent, or Firm—Karl F. Ross; Herbert Dubno

[57] ABSTRACT

A feeding and positioning apparatus for a tire heating press includes a tire blank stand which is provided with a base disk movable in horizontal direction with respect to a platform. Connected to the base disk are a plurality of supports which carry the tire blank along its lateral edge. Extending within the exterior of the tire blank is an upright sleeve extending concentrically to the platform. The sleeve is movable in vertical direction and cooperates with a plurality of clamping jaws which thus are moved against the bead of the tire blank to center the latter.

14 Claims, 5 Drawing Figures

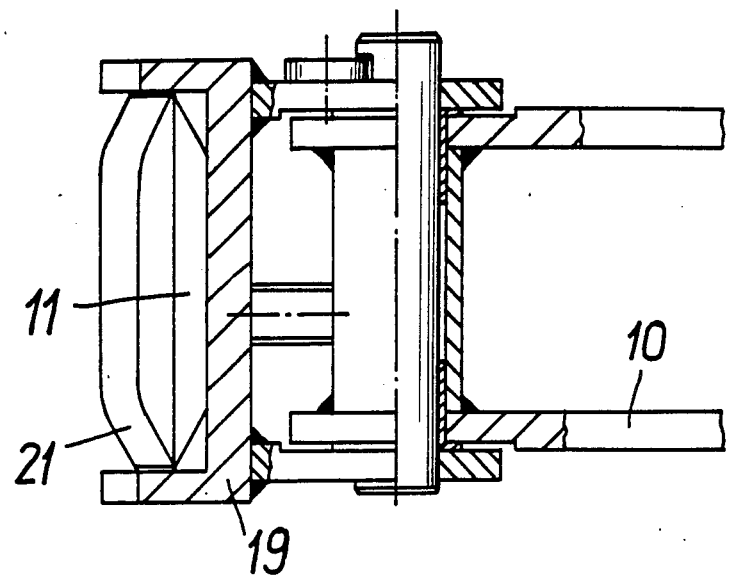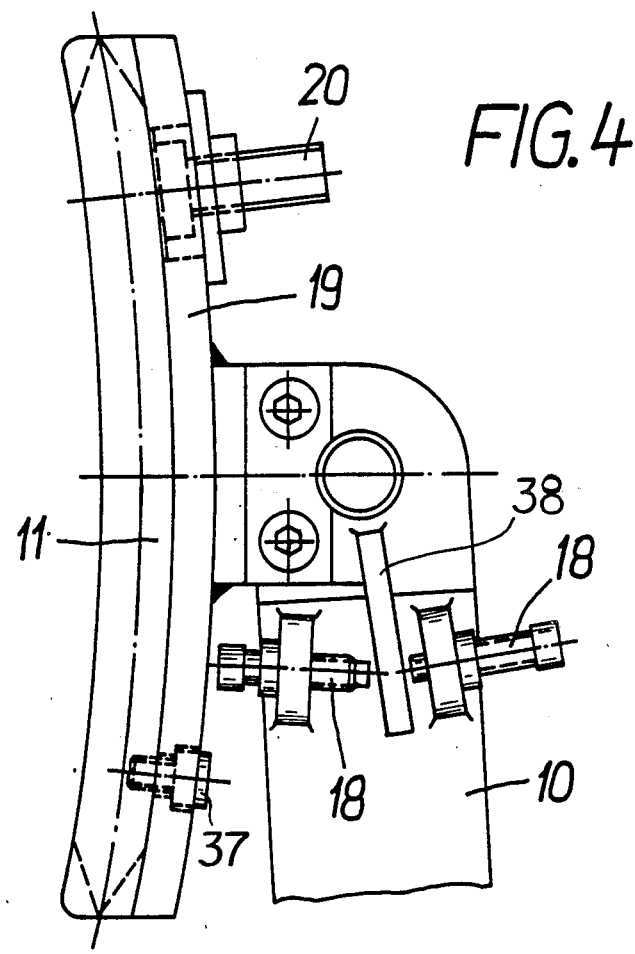

FEEDING AND POSITIONING APPARATUS FOR A HEATING PRESS

FIELD OF THE INVENTION

My present invention refers to a feeding and positioning apparatus for transporting a raw tire or tube blank to a tire heating or vulcanizing press.

BACKGROUND OF THE INVENTION

In the production of pneumatic tires for automotive vehicles a tire carcass is formed and usually built up with belts and the like and formed with the tire beads before the tire is then pressed in a vulcanizing press with heating. Such presses can have a bladder for holding the carcass or tire blank against the heated walls of the mold formed by the press. The blank or raw tire is positioned in the tire heating press which is then closed for the vulcanizing operation.

In general, a feeding and positioning apparatus for the tire bladder press is used to transfer the raw tire or blank into the mold of the press for vulcanization. In order to avoid any defective pressings, it is necessary to accurately center the raw tire within the mold.

From the German patent publication-open application DE-OS 1 804 097, corresponding to U.S. Pat. No. 3,620,561, such a transport system is known in which a swingable gripper is used which is provided with a plurality of axially symmetrical shovel-like gripping arms. These gripping arms seize the raw tires and transfers them from a bead-pressing device into the mold of the tire-heating or bladder press. Accordingly, this prior art uses the bead-pressing device as a raw tire stand so that the raw tire is centered with respect to the bead and clamped by the gripper from the outside.

Such bead pressing devices, however, are not suitable as stands where raw tires are built up and already prepared for vulcanization elsewhere. Moreover, practice has shown that the gripper was not always able to pick up, transfer and deposit the raw tire into the mold with the requisite degree of precision so that mispressing could result.

OBJECT OF THE INVENTION

It is thus the principal object of my present invention to provide an improved feeding apparatus for a tire-heating or tire-vulcanizing press obviating the aforestated drawbacks.

SUMMARY OF THE INVENTION

I realize this object according to the invention by providing a stand which supports the prepared raw tire and includes a platform and a base disk or ring which is movable on the platform in a horizontal direction and is provided with a plurality of angularly spaced peripheral supports attached thereto. Positioned on the platform are a plurality of centrally positioned clamping jaws which are radially movable towards the bead of the raw tire to center the latter. Once centered, the raw tire is seized by a gripper for being transported to the bladder press.

The radial motion of the clamping jaws is provided by axial movement of a sleeve which is arranged concentrically to the pedestal and is movable in vertical direction. The sleeve communicates with the clamping jaws via rack-and-pinion systems to transform the vertical movement of the sleeve into a radial motion of the clamping jaws.

Through the provision of such clamping jaws, raw tires or tire blanks of various size are precisely centered when these clamping jaws lie against the bead of the tire and are maintained in this centered orientation until seized by the gripper and deposited in the mold of the tire-heating press. Since the base disk or ring is movable on roller bearings in horizontal direction, the depositing of the raw tire on the supports is provided in a convenient manner. Preferably, the base disk is under the influence of a locking and releasing mechanism or tension springs such that the base disk returns into the concentric position with respect to the platform without interfering with the centering of the tire.

BRIEF DESCRIPTION OF THE DRAWING

The above and other objects, features and advantages of my present invention will become more readily apparent from the following description reference being made to the accompanying drawing in which:

FIG. 4 is a top view on an enlarged scale of a gripping arm of the feeding apparatus; and FIG. 5 is a cross sectional view of the gripping arm according to FIG. 4.

SPECIFIC DESCRIPTION

Figure 1:
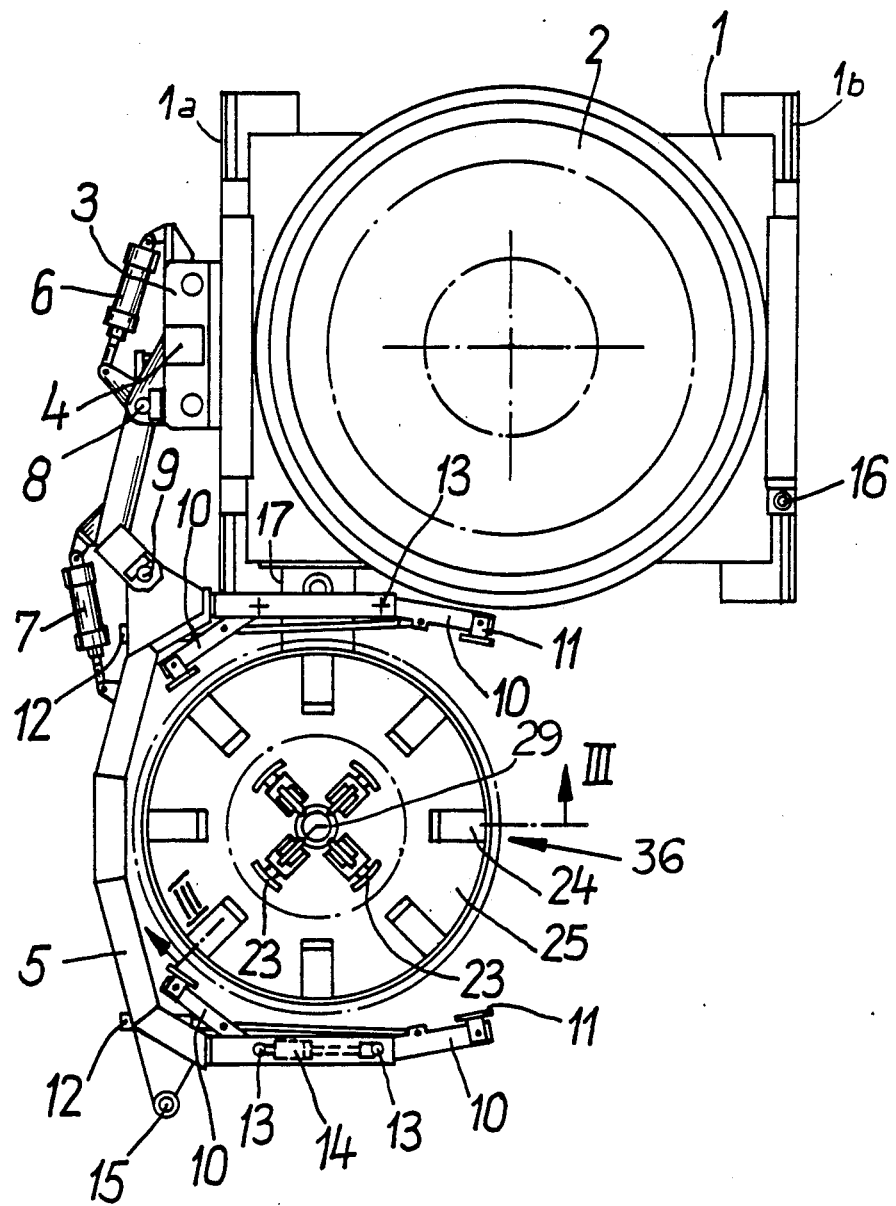
FIG. 1 is a top view of a tire-heating press cooperating with a feeding apparatus according to the invention.
Figure 2:
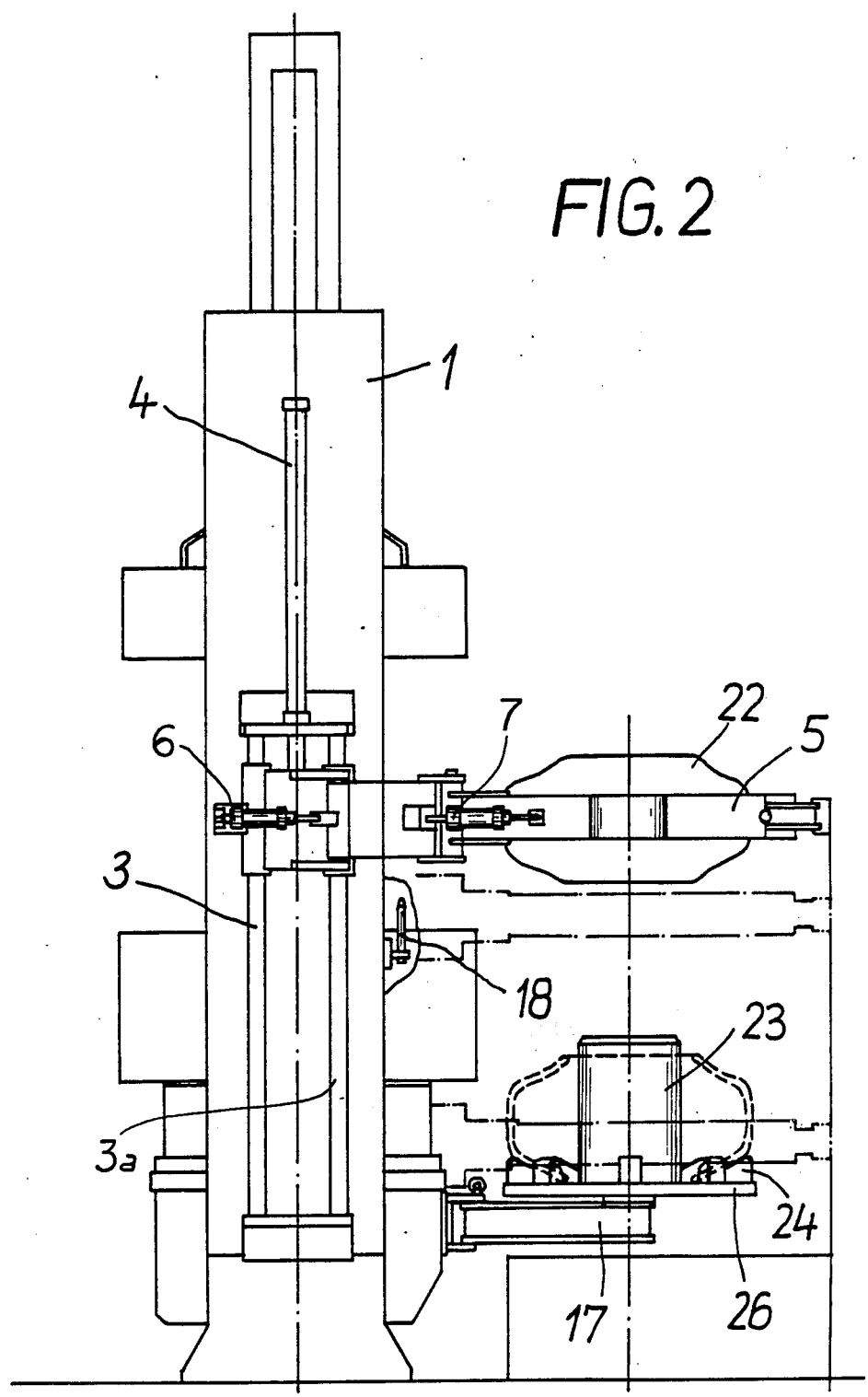
FIG. 2 is a side view of the feeding apparatus of FIG. 1.

Referring firstly to FIGS. 1 and 2, I have shown a tire heating press 1 which is not illustrated in detail as it does not form part of the invention per se but is equipped with lateral flanks, 1a, 1b which surround a tire mold 2. The lateral flank 1a of the heating press 1 supports a guide mechanism 3 whose spaced rods 3a extend in vertical direction. Guided along the rods 3a is a gripper 5 which is moved upwardly and downwardly by a traveling assembly 4 and is provided to carry a raw tire or blanks 22 from a stand 36 in exactly centered manner to the mold 2 as will be described hereinbelow.

The gripper 5 is formed shaped and sectionalized so as to be swingable about hinge points 8 and 9. Connected to the guide mechanism 3 with its one end is a pivoting drive 6 whose other end is articulated to the gripper 5 to allow swinging of the latter about hinge point 8. A further pivoting drive 7 acts upon the gripper 5 to swing the latter about hinge point 9. The forked section of the gripper 5 essentially surrounds the stand 36 and carries at each end section thereof a pair of shovel-like gripper arms 10 which are arranged in an axially symmetrical manner and grasp with their respective contact flanges 11 the raw tire or blank 22.

Each pair of gripper arms 10 is articulated to the gripper 5 so as to be swingable either inwardly or outwardly about hinge points 13 by a respective pivoting drive 12, e.g. a compressed air operable cylinder-piston assembly. Extending between the hinge points 13 of each pair of gripper arms 10 is an arresting mechanism 14 e.g. in form of a compressed air operable cylinder piston assembly which clamps the arms 10 in a desired position when the contact flanges 11 lie against the raw tire 22. When the gripper is swung into position a pin 6 can fit into the sleeve 15.

As is particularly shown in FIG. 5, the contact flanges 11 are saddle-shaped and are preferably adjusted with their contact surface to the smallest-diameter tire blank to be clamped. Each flange 11 is supported via a screw connection 37 in a mounting 19 which is hinged to the associated gripper arm 10 so that the flanges 11 can swing relative to the gripper arms 10. To limit the swinging motion of the flanges 11, the mountings 19 are provided with a lever 38 which projects between two opposing stop pins 18 whose distance from each other is adjustable from outside so that the swing of the flanges 11 is controllable.

As is shown in FIG. 5, the mounting 19 is of U-shaped cross section and accommodates an air cushion 21 in form of a rubber bag or the like which is spanned over the contact flange 11 and is inflatable via a compressed-air supply 20. Thus, by applying the air cushion 21 once the contact flanges 11 lie against the bead 22a of the tire blank 22, the contact surface is considerably increased while a corresponding contact force acting against the bead 22a by each flange 11 is obtained so that the tire blank 22 is accurately and securely transferred from the stand 36 to the mold 2. In order to center the gripper 5 with respect to the mold 2, the gripper 5 is provided with a centering sleeve 15 which cooperates with a centering bolt 16 arranged at the side wall 1b of the bladder press 1.

Figure 3:
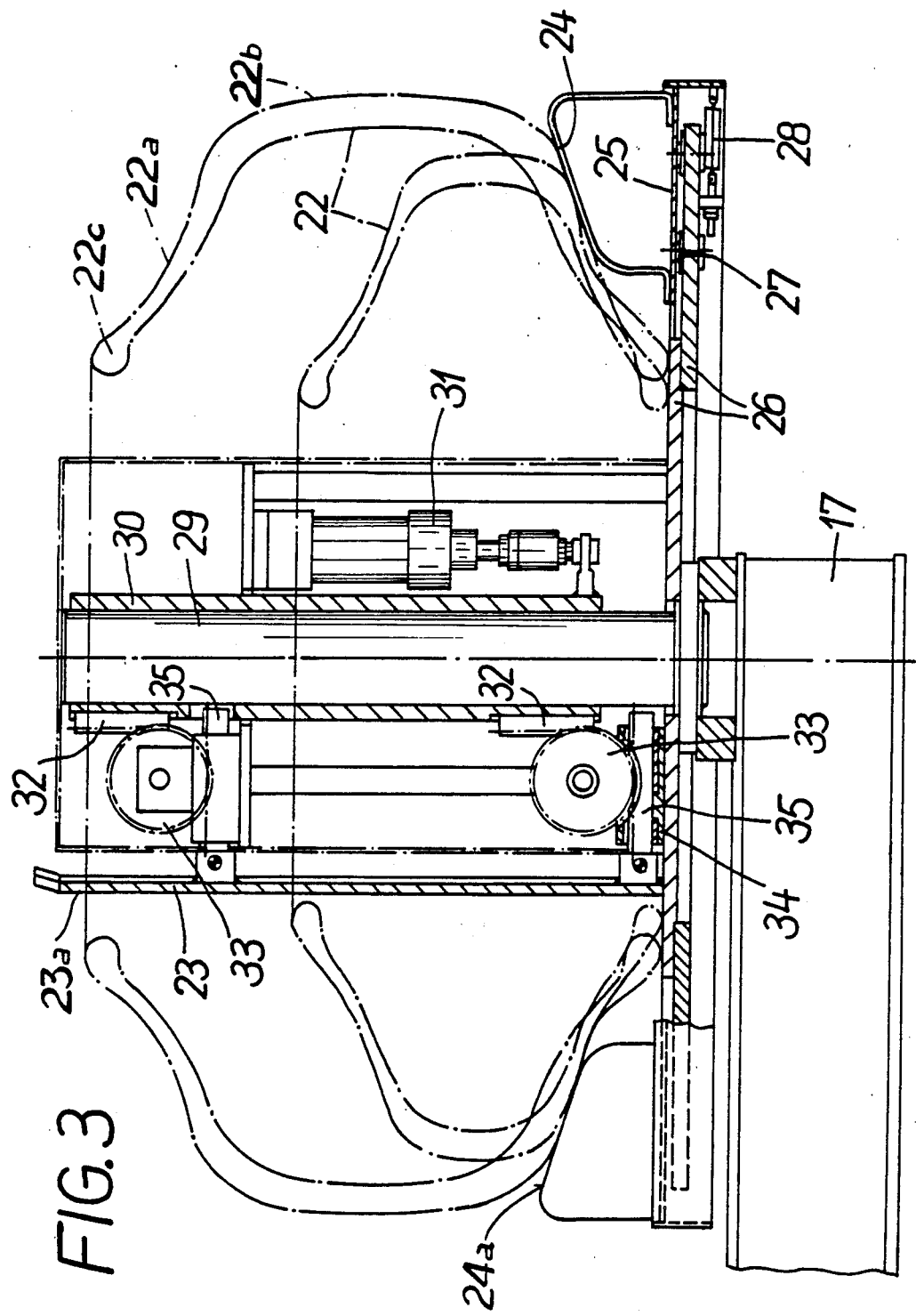
FIG. 3 is a sectional view of the feeding apparatus taken along the line III—III in FIG. 1.

Turning now especially to FIG. 3 which illustrates the device to accurately center the tire blank 22 prior to being picked up by the gripper 5 and placed into the mold 2. Accordingly, the bladder press 1 is provided with a pedestal arm 17 which supports the stand 36 on which the prepared tire blank 22 is placed. The pedestal 17 is fixedly connected to a stationary platform 26. Surrounding the platform 26 is a base disk or ring 25 which is movable in horizontal direction via a ball bearing 27 relative to the platform 26. The concentric arrangement of the base disk 25 and the platform 26 is maintained by tension springs 28 whose tensile force is smaller than the force applied by the tire blank 22 during subsequent centering thereof. Thus, the base disk 25 returns into the concentric position after the tire blank is seized by the gripper 5 and transferred to the mold 2 and does not interfere with the centering of the tire blank during operation of the clamping jaws 23. I may note that instead of the described tension spring 28, also a locking and releasing mechanism with pneumatic tension or compression element can be used.

Mounted on the base disk 25 are a plurality of radially inwardly directed supports 24 which are uniformly spaced about the circumference of the disk 25. The supports 24 have each an upper surface 24a which is slanted towards the interior of the disk 25 and is provided to support the tire blank 22 essentially at its lateral edge between tread 22a and side wall 22b. Due to the mobility of the base disk 25, the tire blanks 22 are supported along their lateral edge regardless of their size and thus are supported along their most stable area as illustrated in FIG. 3 in dash dot lines representing two tire blanks 22 of different size.

Supported by the pedestal 17 is a vertically extending pin 29 which is encased by a guide sleeve 30. The sleeve 30 is concentrically arranged with respect to the platform 26 and is movable in vertical direction by a drive mechanism 31 which is laterally attached to the sleeve 30. Spaced about its circumference at an upper and lower section, the sleeve 30 is provided with a plurality of tooth systems or racks 32 which mesh with respective pinion gears 33 of associated clamping jaws 23. The sleeve 30 is thus surrounded by a plurality of angularly equispaced clamping jaws 23—four in the present embodiment—each of which having an upper and lower gear 33 with tangentially extending axis and meshing with the respective tooth system or rack 32 on the sleeve 30.

In order to transform the vertical movement of the sleeve 30 into a radial motion of the clamping jaws 23, each gear 33 cooperates with an externally toothed and radially extending rack 35 which runs on a support 34 and is fixed to the front wall 23a of the respective clamping jaw 23. As is shown in FIG. 3, the front wall 23a faces the bead 22c and is slightly curved to provide sufficient contact with the bead 22c.

Thus, when a tire blank 22 is placed with its lateral edge resting on the supports 24 (FIG. 3) and brought into a concentric position by the horizontal movement of base disk or ring 25, the clamping jaws 23 are simultaneously moved with their front wall 23a against the bead 22c by the sleeve 30 until the tire blank 22 is precisely centered. Subsequently, the gripper 5 is actuated until the flanges 11 of the gripper arms 10 lie pressureless against the tread 22b. In this position, the gripper arms 10 are locked by the arresting devices 14 and the rubber bag is inflated to provide the air cushion 21 which exerts a required predetermined pressing force against the tread 22c. Since the air cushions 21 apply the same pressure onto the tread 22c at all points of application, the tire blank is uniformly deformed and thus is transferred by means of the gripper 5 in a precisely centered position within the mold 2. After inserting the tire blank 22 within the mold 2, the rubber bag is deflated again.

Although the gripper 5 is described as having paired arms 10, it is certainly feasible to provide the gripper with three or five such gripper arms arranged axially symmetrical to the tire blank 22.

I claim:

1. A feeding and positioning apparatus for transporting a tire blank to a tire-heating press, comprising:
    a stand for holding the tire blank prior to its transport to the press, said stand including a stationary horizontal platform and support means movable in a horizontal direction relative to said platform;
    aligning means cooperating with said support means for centering the tire blank with respect to a bead thereof, said aligning means extending vertically within the tire blank and having means movable in a radial direction against the bead of the tire blank; and
    gripping means for transporting the centered tire blank from the stand to the press, said support means including a base disk surrounding said platform, a plurality of supports arranged about the circumference of said disk for supporting the tire blank along its lateral edge and ball bearings for allowing said disk to be horizontally moved with respect to said platform.

2. A feeding and positioning apparatus as defined in claim 1 wherein said aligning means include a sleeve extending concentrically with respect to said platform and being movable in vertical direction, said sleeve being provided with a tooth system at an upper and lower portion thereof, a plurality of clamping jaws spaced from each other about said sleeve, each of said clamping jaws being provided at its upper and lower portion with a gear with a tangentially extending axis, said gears of said clamping jaws respectively meshing with said tooth systems on said sleeve, and an externally toothed rack cooperating with each gear of said clamping jaws so that the vertical movement of said sleeve is converted into a radial motion of said clamping jaws.

3. A feeding and positioning apparatus as defined in claim 1, further comprising locking and releasing means for allowing said base disk to be kept in concentric position with respect to said platform.

4. A feeding and positioning apparatus as defined in claim 1, further comprising spring means cooperating with said base disk for yieldably biasing said disk toward concentric position with respect to said platform, said spring means exerting a tensile force which is smaller than the force exerted by the tire blank onto said base disk via said supports during centering thereof by said aligning means.

5. A feeding and positioning apparatus as defined in claim 4 wherein said spring means include tension springs.

6. A feeding and positioning apparatus as defined in claim 2 wherein said gripping means includes a bifurcated gripper to define two gripper portions each of which being articulated to a pair of gripper arms via a pair of respective hinge points, each of said gripper arms being provided with a contact flange at their end remote to said hinge points with said gripper, and further including an adjusting mechanism for each pair of gripper arms to allow swinging of said gripper arms.

7. A feeding and positioning apparatus as defined in claim 6 wherein said contact flanges are articulated to said gripper arms to allow a swinging motion of said contact flanges relative to said arms, said gripping means further including a mounting interposed in between each gripper arm and aligned contact flange, each mounting being provided with a lever, and further comprising a pair of opposing stop pins which are adjustable and cooperate with said lever for limiting the deflection of said lever to control the swing of said contact flange.

8. A feeding and positioning apparatus as defined in claim 6, further comprising arresting means extending between said hinge points of each gripper arm for locking said contact flanges when lying against the tire blank.

9. A feeding and positioning apparatus as defined in claim 6 wherein the tire blank has a tread, said contact flanges each being provided with a contact surface resting only against the tread of the tire blank.

10. A feeding and positioning apparatus as defined in claim 9 wherein said contact surface of said flanges is of saddle shape and adapted to a smallest one of the raw tire blanks.

11. A feeding and positioning apparatus as defined in claim 10, comprising an air cushion providing element spanning over said contact surface of each contact flange, said element being inflatable for gripping the tire blank after said contact flanges lie against said tread in a pressureless manner.

12. A feeding and positioning apparatus as defined in claim 11 wherein said element is a rubber bag.

13. A feeding and positioning apparatus for transporting a tire blank to a tire-heating press, comprising:
a stand for holding the tire blank prior to its transport to the press, said stand including a stationary horizontal platform and support means movable in a horizontal direction relative to said platform;
aligning means cooperating with said support means for centering the tire blank with respect to a bead thereof, said aligning means extending vertically within the tire blank and having means movable in a radial direction against the bead of the tire blank;
gripping means for transporting the centered tire blank from the stand to the press, said gripping means including a bifurcated gripper to define two gripper portions each of which being articulated to a pair of gripper arms via a pair of respective hinge points, each of said gripper arms being provided with a contact flange at their end remote to said hinge points with said gripper;
an adjusting mechanism for each pair of gripper arms to allow swinging of said gripper arms;
arresting means extending between said hinge points of each gripper arm for locking said contact flanges when lying against the tire blank, the tire blank having a tread, said contact flanges each being provided with a contact surface resting only against the tread of the tire blank, said contact surface of said flanges being of saddle shape and adapted to a smallest one of the raw tire blanks; and
an air cushion providing element spanning over said contact surface of each contact flange, said element being inflatable for gripping the tire blank after said contact flanges lie against said tread in a pressureless manner.

14. A feeding and positioning apparatus as defined in claim 13 wherein said element is a rubber bag.

* * * * *